June 7, 1955 F. THOMSEN 2,710,120
SHUTTER FOR FERTILIZER DISTRIBUTORS
Filed June 13, 1952 2 Sheets-Sheet 1

Fred Thomsen
INVENTOR.

June 7, 1955  F. THOMSEN  2,710,120
SHUTTER FOR FERTILIZER DISTRIBUTORS
Filed June 13, 1952  2 Sheets-Sheet 2

Fred Thomsen INVENTOR.

BY *Clarence A. O'Brien*
*and Harvey B. Jacobson*
Attorneys

United States Patent Office 2,710,120
Patented June 7, 1955

2,710,120

SHUTTER FOR FERTILIZER DISTRIBUTORS

Fred Thomsen, Council Bluffs, Iowa, assignor of fifty per cent to Carl Young, Council Bluffs, Iowa Application June 13, 1952, Serial No. 293,316

3 Claims. (Cl. 222—486)

This invention relates in general to shutter means, and more particularly to a shutter for fertilizer distributors.

Commercial fertilizer distributors are generally provided with a closure plate adjustably secured to the underside thereof, said closure plate having openings therein adapted to be aligned with openings in the bottom of the fertilizer storage trough whereby the amount of fertilizer distributed may be varied. The plates normally provided with the commercial fertilizer distributors are provided with a plurality of knockouts whereby the spreading of fertilizer may be varied to accommodate various crop row widths. However, once the knockouts have been removed and it is desired to utilize the fertilizer distributor in fertilizing crops having other row widths, it is necessary to weld the knockouts back in their respective openings and remove other knockouts which correspond to the new row width. It is, therefore, desirable to provide a shutter for fertilizer distributors which may be quickly and easily adjusted to various row widths.

The primary object of this invention is to provide an improved shutter for commercial fertilizer distributors, said shutter having means whereby the shutter may be quickly and easily adjusted for fertilizing various row widths of crops.

Another object of this invention is to provide an improved shutter for fertilizer distributors, said shutter having detachable means for selectively closing fertilizer distribution openings whereby the distribution of fertilizer may be quickly varied.

A further object of this invention is to provide removable covers for openings in fertilizer distributor shutters, said covers being adapted to be mounted on shutters now on the market.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Similar characters of reference designate similar or identical elements and portions throughout the specification and throughout the different views of the drawings.

Figure 1:
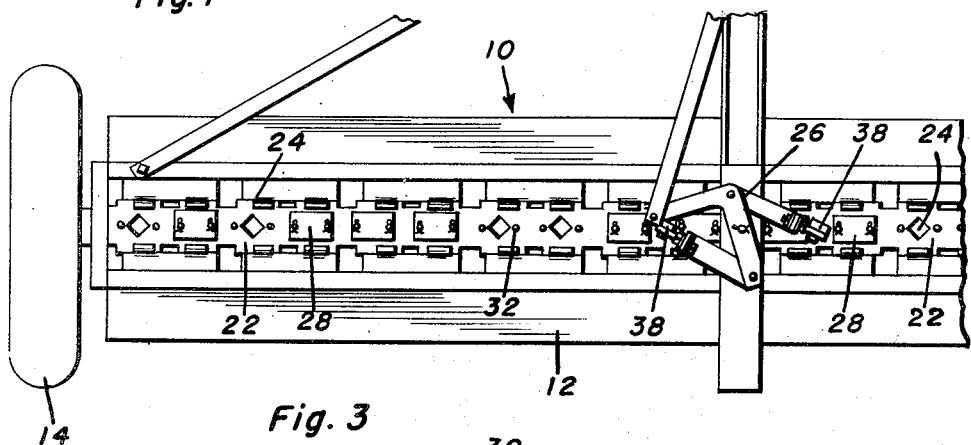
Figure 1 is a fragmentary bottom plan view of a commercial fertilizer distributor, said fertilizer distributor having mounted thereon the improved shutter which is the subject of this invention.
Figure 3:
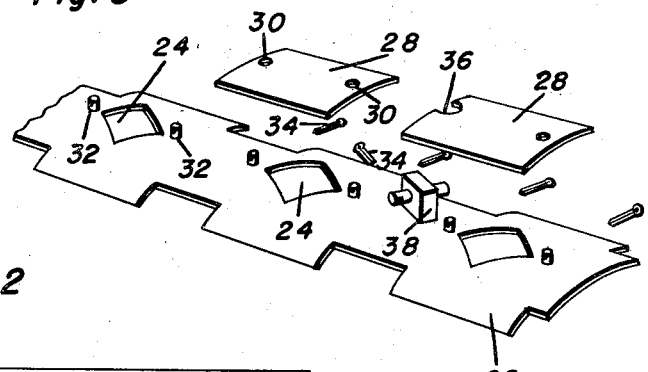
Figure 3 is an enlarged exploded view of one end of a shutter conforming to the spirit of this invention, the shutter being provided with the preferred form of removable covers for the fertilizer distribution openings therein.
Figure 2:
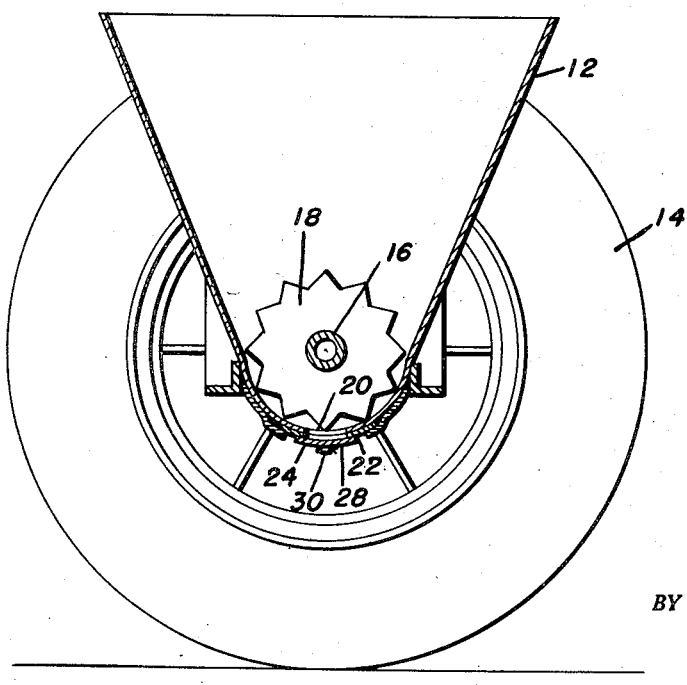
Figure 2 is an enlarged transverse vertical sectional view taken substantially upon a vertical plane adjacent one wheel of the fertilizer distributor and shows the general construction thereof and the manner in which the shutter is secured to the underside of the fertilizer trough.

Referring now to Figures 1 and 2 in particular, it will be seen that there is illustrated a fertilizer distributor, which is referred to in general by the reference numeral 10. The fertilizer distributor 10 includes a generally triangular shaped cross sectional fertilizer supply trough 12 which has mounted at the ends thereof wheels 14 for supporting the same while traveling over the ground. The wheels 14 are connected to an axle 16 which extends longitudinally through the lower portion of the fertilizer supply trough 12 and is adapted to rotate with the wheels 14. The axle 16 has mounted thereon fertilizer vibrating elements 18 which keeps the fertilizer in a loosened state and urges the same towards the bottom of the trough 12.

The bottom of the fertilizer supply trough 12 is transversely curved and provided at spaced intervals with openings 20 therethrough for the passage of fertilizer. In order that the passage of fertilizer through the openings 20 may be controlled, there is secured to the underside of the fertilizer distributing trough 12 a shutter 22 in the form of an elongated plate. It will be understood that the shutter 22 is removably secured to the underside of the fertilizer supply trough 12 and extends one-half the length thereof. The shutter 22 is provided with fertilizer distributing openings 24 and is adjustably mounted whereby they may be slid longitudinally of the fertilizer supply trough 12 to vary the registering of the openings 24 with the openings 20. Longitudinal movement of the shutter 22 is controlled by a shutter adjusting mechanism 26 which is of conventional construction and will not be described in more detail.

In order that the fertilizer may be distributed only adjacent to the rows of crops, the shutter 22 has secured to the underside thereof a plurality of cover members 28 which are utilized to selectively cover the fertilizer distributor openings 24 therein. The cover members 28 are in the form of short plates which are transversely curved in the same manner as is the shutter 22 and are secured over their respective fertilizer distributing openings 24. The cover members 28 are provided with apertures 30 adjacent the ends thereof which receive downwardly projecting circular pins 32 carried by the shutter 22. The cover members 28 are retained on the pins 32 by cotter pins 34 which pass through the lower portion of the pins 32 and prevent the removal of the cover members 28. It will be noted that one of the cover members 28 is provided with an enlarged opening 36 in one edge thereof. This is necessitated by the position of a connecting block 38 to which the adjusting means 26 is connected and the opening 36 is required to provide a clearance for the connecting block 38.

Figure 4:
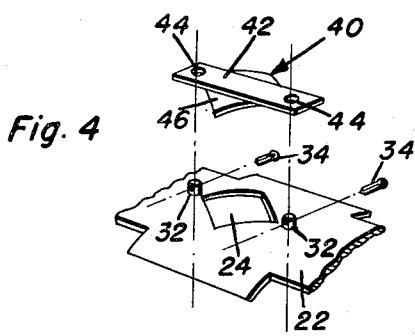
Figures 4 through 10 are perspective views of portions of modified forms of shutters and covers therefor.

Referring now to Figure 4 it will be seen that there is illustrated a modified form of cover member, which is referred to in general by the reference numeral 40. The cover member 40 may be secured to the shutter 22 in the same manner as are the cover members 28 by utilizing the downwardly projecting pins 32 and the locking cotter pins 34. The cover member 40 includes a flat strap 42 having openings 44 adjacent the ends thereof for receiving the pins 32, and has secured to the underside thereof a transversely curved closure element 46 which snugly fits within the fertilizer distributor opening 24 in the shutter 22 and closes the same.

Figure 8:
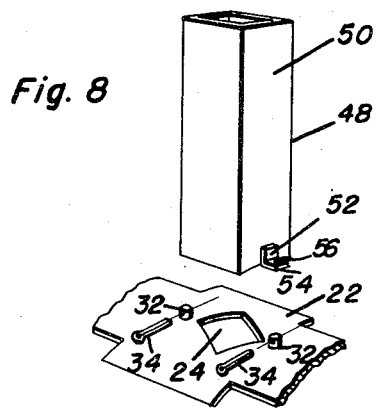

Referring now to Figure 8 in particular, it will be seen that there is illustrated a type of distributing member, which is referred to in general by the reference numeral 48, which may be secured to the shutter 22 over the fertilizer distributing openings 24. The distributing member 48 is in the form of a rectangular cross section tubular opening chute 50 for directing the flow of fertilizer passing through the fertilizer distributing openings 24. The chute 50 has secured to opposite ends thereof angle brackets 52 which include horizontal flanges 54 having openings 56 therethrough. The openings 56 are adapted to receive the pins 32 of the shutter 22 and are retained thereon by the cotter pins 34.

Figure 5:
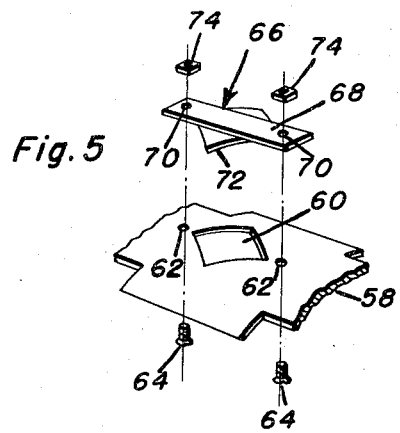

Referring now to Figure 5 in particular, it will be seen that there is illustrated a modified form of shutter, which is referred to in general by the reference numeral 58. The shutter 58 is similar to the shutter 22 and includes a plurality of fertilizer distributing openings 60 of the same shape as the fertilizer distributing openings 24. The shutter 58 is provided with a pair of bores 62 adjacent the ends of each fertilizer distributing opening 60 through which are adapted to project threaded fasteners 64.

Adapted to be secured to the shutter 58 by the fasteners 64 are closure members, which are referred to in general by the reference numeral 66. It will be noted that the closure members 66 are identical to the closure members 40 and include straps 68 having apertures 70 adjacent the ends thereof. The straps 68 also have secured to the underside thereof closure elements 72 which are adapted to be received within the fertilizer distributing openings 60 and close the same. The closure members 66 are secured to the shutter 58 by the fasteners 64 which pass through the apertures 70 and are secured therein by nuts 74 adapted to be threadedly engaged on the ends thereof.

Figure 6:
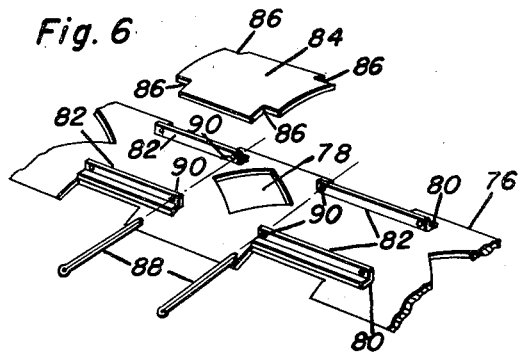

Referring now to Figure 6 in particular, it will be seen that there is illustrated another form of shutter, which is referred to in general by the reference numeral 76. The shutter 76 is provided with a plurality of fertilizer distributing openings 78 which are identical to the fertilizer distributing openings 24 of the shutter 22. Positioned adjacent the edges of the shutter 76 and disposed between adjacent fertilizer distributing openings 78 are spaced parallel angle members 80 which have downwardly projecting flanges 82. Adapted to overlie each of the fertilizer distributing openings 78 is a transversely curved cover member 84, which is similar to the cover member 28, but is imperforate. Furthermore, the cover member 84 has the corners thereof removed to form notches 86, the notches 86 forming clearance for the ends of the angle members 80. The cover member 84 is secured in position by a pair of spaced parallel elongated cotter pins 88 which overlie the end portions of the cover member 84 and are received through transversely aligned apertures 90 in the ends of the flanges 82.

Figure 7:
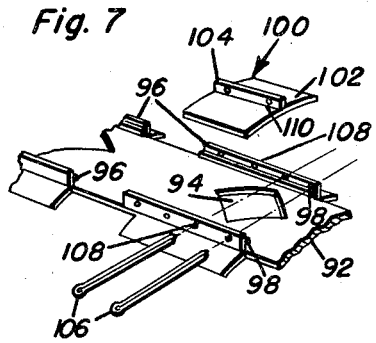

Referring now to Figure 7 in particular, it will be seen that there is illustrated still another modified form of shutter which is referred to in general by the reference numeral 92. The shutter 92 is provided at spaced intervals with conventional fertilizer distributing openings 94 and has secured to the underside thereof adjacent its edges spaced parallel T-shaped guide members 96. It will be noted that the T-shaped guide members 96 are disposed adjacent the fertilizer distributor openings 94 and the stems 98 thereof are in transverse alignment and spaced slightly above the surface of the shutter 92.

The shutter 92 is provided with a plurality of cover members, which are referred to in general by the reference numeral 100 for closing the openings 94. The cover members 100 include transversely curved plates 102 having longitudinally extending downwardly projecting flanges 104 at their midpoints. The edges of the plates 102 are adapted to be positioned below the stem portions 98 of the T-shaped guide members 96 and are retained in adjusted positions by elongated transversely extending cotter pins 106. The cotter pins 106 pass through aligned apertures 108 in the T-shaped guide members 96 and apertures 110 in the flanges 104.

Figure 9:
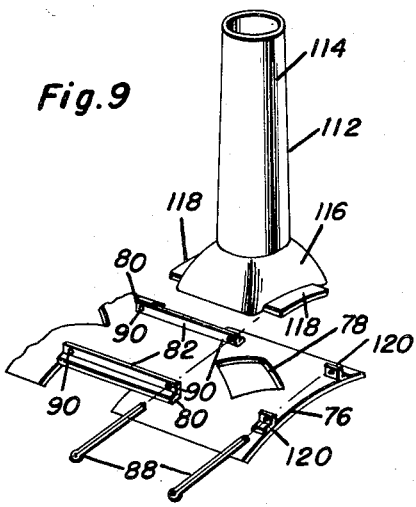

Referring now to Figure 9 in particular, it will be seen that there is illustrated another form of chute, which is referred to in general by the reference numeral 112, the chute being adapted to be utilized in connection with the shutter 76. The chute 112 includes an elongated tubular chute portion 114 which is secured to the bottom of a funnel-shaped upper portion 116, the funnel-shaped upper portion 116 being provided with a pair of outwardly projecting transversely extending flanges 118. The flanges 118 are adapted to be overlaid by the cotter pins 88 and retained in place thereby. It will be noted that the extreme end of the shutter 76 is provided with extremely short lengths of angle stock, which are referred to by the reference numeral 120.

Figure 10:
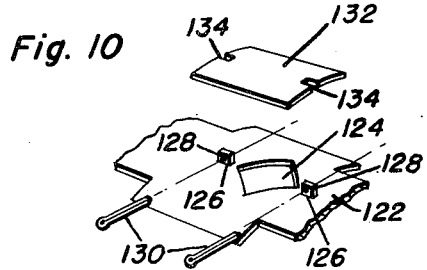

Referring now to Figure 10 it will be seen that there is illustrated a still further modified form of shutter, which is referred to in general by reference numeral 122. The shutter 122 is provided at spaced intervals with conventional fertilizer distributing openings 124 and has projecting downwardly therefrom adjacent each fertilizer distributing opening 124 a pair of longitudinally spaced rectangular cross sectional lugs 126. The lugs 126 are provided with transversely extending apertures 128 adapted to receive cotter pins 130.

Associated with each fertilizer distributing opening 124 of the shutter 122 is a cover member 132, the cover member 132 being in the form of a transversely curved plate. The ends of cover member 132 are provided at their midpoints with inwardly extending slots 134 which are adapted to receive the lugs 126 and be secured thereto by the cotter pins 130.

It will be understood that the shutters and their associated cover members, as illustrated in Figures 3 to 10, have been illustrated in their inverted positions in order to clearly illustrate the details thereof.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A shutter for a fertilizer distributor comprising an elongated plate adjustably secured to the underside of a hopper, said elongated plate having a plurality of openings adapted for registering with openings in the underside of said hopper, means for selectively closing individual openings in said elongated plate, said means including short cover members removably secured to the underside of said elongated plate over said openings, said cover members being provided with openings receiving projecting elements carried by said elongated plate adjacent openings therein, fasteners carried by said projecting elements securing said cover members in place.

2. A shutter for a fertilizer distributor comprising an elongated plate adjustably secured to the underside of a hopper, said elongated plate having a plurality of openings adapted for registering with openings in the underside of said hopper, means for selectively closing individual openings in said elongated plate, said means including short cover members removably secured to the underside of said elongated plate over said openings, longitudinally extending flanges carried by said elongated plate, said cover members being positioned between said flange and retained in place by elongated fasteners extending between said flanges.

3. A shutter for a fertilizer distributor comprising an elongated plate adjustably secured to the underside of a hopper, said elongated plate having a plurality of openings adapted for registering with openings in the underside of said hopper, means for selectively closing individual openings in said elongated plate, said means including short cover members removably secured to the underside of said elongated plate over said openings, spaced parallel guides carried by said elongated plate, opposite edges of said cover members associated with said guides, fasteners passing through said guides and flanges on said cover members to adjustably secure said cover members in place.

References Cited in the file of this patent

UNITED STATES PATENTS

| | | |
|---|---|---|
| 1,035,195 | Hudson | Aug. 13, 1912 |
| 1,308,252 | Nelson | July 1, 1919 |